June 3, 1930.   A. LENNING ET AL   1,761,573
VALVE
Filed May 21, 1929
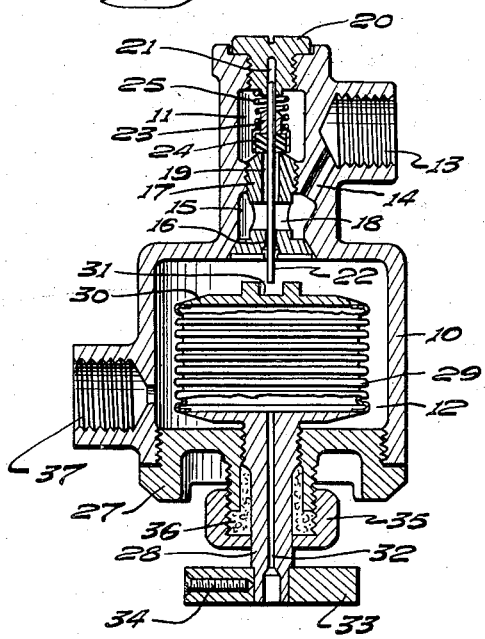
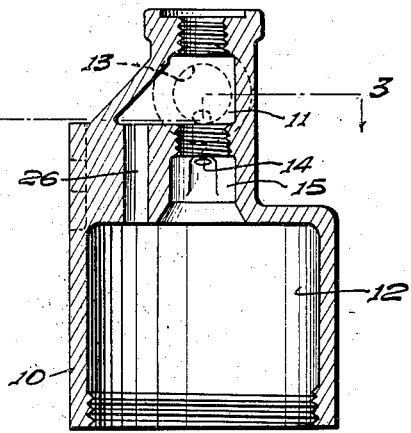
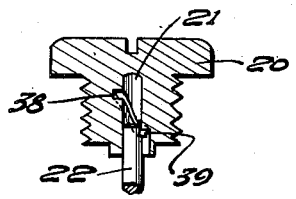
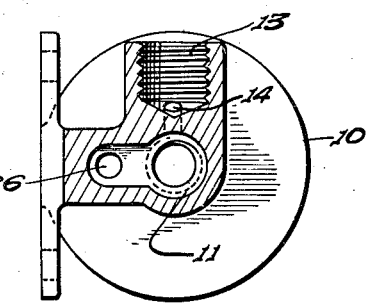
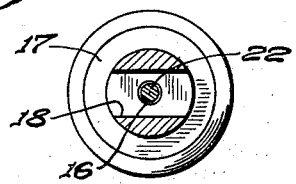
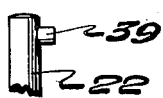
INVENTORS
Alvar Lenning
Robert Seth Taylor
BY
Wm J Hedlund
their ATTORNEY.

Patented June 3, 1930

1,761,573

UNITED STATES PATENT OFFICE

ALVAR LENNING, OF JACKSON HEIGHTS, NEW YORK, AND ROBERT SETH TAYLOR, OF NEW YORK, N. Y., ASSIGNORS TO ELECTROLUX SERVEL CORPORATION, OF NEW YORK, N. Y., A CORPORATION OF DELAWARE

VALVE

Application filed May 21, 1929. Serial No. 364,787.

The object of our invention is to provide an improved form of thermostatically controlled valve wherein the flow of a liquid is regulated by the temperature thereof.

In such a valve it is necessary that a small flow therethrough takes place continuously in order that variations in the temperature of the liquid will be assured of being communicated to the thermostatic element. If there was no such flow, when the valve became completely closed great variations in the temperature of the liquid, which should cause the valve to open, could take place at a point remote from the valve and the stationary liquid in and near the valve would effectively insulate the thermostatic element from such temperature variations. On the other hand, it is desirable that this constant flow should be as small as possible so that there will be no unnecessary waste of liquid.

Heretofore this flow has sought to be obtained by either providing a small passageway around the valve or so designing the valve itself that when seated there will still be a small flow past the valve seat. In practice, especially when applied to a cooling water system, the first method is not satisfactory due to the fact that the small passageway is likely to become clogged with solid impurities. The second method overcomes this difficulty to some extent due to the fact that the valve, in seating and unseating, tends to dislodge the foreign matter which has collected in the small passageway past the valve seat. However, it has been found that the movement of the valve is not of such a nature as to effectively remove the collecting material.

Also, in a valve of this nature, it is desirable to use a valve having a seating part made of rubber or some similar resilient material in order to eliminate all noise when the valve closes. In this type of valve a leak past the valve seat is impractical on account of the resilient quality of the material of which the seating part is constructed.

In order to overcome all the aforementioned faults and particularly to make possible the use of a rubber seating part, the hereinafter described valve is made with a leak past the valve stem at a point remote from the valve. The reciprocating movement of the valve stem serves to dislodge any particles which would tend to clog the leak passage.

Other objects and advantages will be apparent from the following description considered in conjunction with the accompanying sheet of drawings on which:

Fig. 1 is an elevational view, chiefly in cross-section, of a preferred embodiment of the invention;

Fig. 2 is a cross-sectional view of a portion of the valve shown in Fig. 1 but rotated 90° about a vertical axis from the position shown in the first figure;

Fig. 3 is a cross-sectional view taken on the line 3—3 of Fig. 2;

Figs. 4 and 5 show a modification of the invention; and

Fig. 6 is a section in detail of a portion of the device shown in Fig. 1.

Referring more particularly to Fig. 1, reference character 10 indicates a valve casing which comprises a valve chamber 11 and a thermostat chamber 12. An intake 13 communicates with a passageway 14 which extends downwardly through casing 10 to a chamber 15 intermediate of chambers 11 and 12. The bottom of chamber 15 is closed except for a central passageway 16 through the lower portion of a member 17 which screws into the casing.

Member 17 is provided with a lateral passageway 18. From passageway 18 the passageway 16 extends downwardly and a larger passageway 19 extends upwardly through member 17. The top of member 17 forms a valve seat.

The upper end of valve chamber 11 is closed by a plug 20 screwed into the housing. A cylindrical guideway 21 extends from the inner end of plug 20 part way through the plug.

A valve stem 22 extends from within chamber 12 through passageways 16 and its upper end extends into guideway 21. A valve member 23 is mounted on stem 22 so as to seat on the upper end of member 17 and thus close passageway 19 therethrough. The portion or face of valve member 23 which comes in contact with member 17 is made of an annular piece of rubber 24, or other like material, in order to render the action of the valve noiseless. A coil spring 25, one end of which bears against plug 20 and the other against valve 23, tends to keep the valve seated against member 17. Passageway 19 has a diameter considerably larger than that of valve stem 22 while the diameter of passageway 16 is only slightly greater than the diameter of the stem. (See Fig. 6.) The lower part of stem 22 serves, on movement, to act as a cleaning means within restricted passageway 16.

A duct 26 (Figs. 2 and 3) establishes communication betwen valve chamber 11 and thermostat chamber 12. Screwed into the lower end of chamber 12 is a large plug 27 through the center of which is a threaded aperture. Screwed into this aperture is a hollow spindle 28 to the inner end of which is hermetically sealed a circumferentially corrugated, longitudinally expansible and contractable member 29, hereinafter referred to as a thermostatic element or simply as a bellows. The opposite end of bellows 29 is hermetically sealed by a plate 30 which has a recess 31 formed on the outer side thereof to receive the lower end of stem 22. Bellows 29 is charged through a duct 32 in spindle 28 with a suitable liquid, such as ethyl chloride, and vapor of this liquid, after which the duct is hermetically sealed, as by forming a plug from molten metal in its enlarged outer end.

A small hand wheel 33 is affixed to the outer end of spindle 28 by means of a setscrew 34. By rotating wheel 33 the position of bellows 29 with respect to valve stem 22 may be varied. A gland nut 35 serves to compress a packing 36 around spindle 28 and thus prevents leakage of liquid from chamber 12 and also prevents the spindle turning so easily as to be accidentally rotated out of proper adjustment. An outlet 37 is provided in the casing 10 from the lower part of chamber 12.

In the modification shown in Figs. 4 and 5 guideway 21 in plug 20 is provided with a spiral grove 38 which engages a projection 39 on valve stem 22. The pitch of the groove is sufficiently steep to permit the stem to reciprocate and the arrangement is such that when the stem is reciprocated, it will also be forced to rotate.

A typical use of the valve is in connection with a refrigerating apparatus. Assume that intake 13 is connected by means of a conduit with the cooling water system of such an apparatus. The system is supplied with water from any suitable source, such as a city main. The water circulates in heat exchange relationship with heat giving parts of the refrigerating apparatus, for instance the condenser, where it absorbs heat and is thence discharged to waste. As it is desirable that no more water be used than is necessary for proper cooling, it is essential that the flow be automatically regulated so that the temperature of the water leaving the cooling system be maintained substantially constant. If the temperature were too high proper cooling would not be obtained, while if too low, more water than necessary would be used. The valve accomplishes this result as follows:

Assume the valve to be partially open, that is, the bellows 29 is expanded sufficiently to raise valve stem 22 against the action of spring 25 and hence valve member 23 is raised from its seat. Water from the cooling system enters intake 13, passes through passageways 14, 18 and 19 and past valve member 23 into valve chamber 11. From here it passes through duct 26 into thermostat chamber 12 where it comes in contact with bellows 29 and thence passes through outlet 37 to waste. This flow will remain unaltered as long as the temperature of the water entering the valve remains the same. However, suppose the temperature of the water decreases. When the cooler water enters chamber 12, as above described, it will cool bellows 29 and the charge of liquid and vapor contained therein. This causes a condensation of some of the vapor and a corresponding reduction in the total volume of the charge which causes, or allows, the bellows to contract longitudinally. This allows spring 25 to force valve stem 22 and valve member 23 downwardly. If the reduction in temperature and resulting contraction of the bellows is sufficient, valve member 23 will be seated on member 17 and completely stop the flow of water through passageway 19.

However, even though valve member 23 is in complete closed position, there will still be some flow into chamber 12. This flow takes place from passageway 18 through passageway 16 around valve stem 22. The annular space between the stem and the side of passageway 16 is small so that the flow therethrough is slight but still sufficient to allow a small quantity of the water which has become heated in the cooling system to flow into chamber 12. This hot water causes vaporization of some of the liquid within bellows 29 which causes the bellows to expand and thus raise val e stem 22 and move valve member 23 from its seat. Flow now takes place through the valve as first described and continues thus until the temperature of the water passing therethrough drops sufficiently to cause the valve to close again. In this manner, the valve serves to maintain substantially constant the temperature of the water leaving the cooling system.

The continued intermittent movement of stem 22 through passageway 16 serves to dislodge any particles of dirt which would otherwise remain therein and clog up the passageway. In the modification shown in Figs. 4 and 5 stem 22 is given a rotary, as well a reciprocating motion, by forming a spiral groove 38 in the bore of guideway 21 and providing a projection 39 near the upper end of the stem for engagement in this groove. Thus, when the stem is forced upwardly by the expansion of bellows 29, it will be forced to rotate in one direction by the coaction of the projection and the groove, and when the stem is moved downwardly by spring 25, it will rotate in the opposite direction. Such rotary motion further aids in keeping passageway 16 free from dirt.

Variations in the predetermined temperature of the water which is desired to be maintained may be obtained by varying the position of bellows 29 relative to valve stem 22. This is done by turning hand wheel 33 which causes spindle 28 to be screwed further in or out of plug 27. Turning the wheel and spindle in a clockwise direction causes the valve to open at a lower temperature while turning it in the opposite direction causes it to open at a higher temperature.

While we have described a preferred embodiment of the invention, it is clear that structural variations and modifications fall within its scope which is to be limited only by the appended claims viewed in the light of the prior art.

What we claim is:

1. A valve of the class described comprising a casing having an inlet, a thermostat chamber, said valve having a first communication between said inlet and said thermostat chamber, means to close said first communication, said valve having a second and restricted communication between said inlet and said thermostat chamber, cleaning means within said restricted communication, a thermostatic element within said thermostat chamber for actuating the closing means and said valve having an outlet from said thermostat chamber.

2. A valve of the class described comprising a casing having an inlet, a thermostat chamber, said valve having a first communication between said inlet and said thermostat chamber, means to close said first communication, said valve having a second and restricted communication between said inlet and said thermostat chamber, cleaning means within said restricted communication, a thermostatic element within said thermostat chamber for actuating the closing means and the cleaning means and said valve having an outlet from said thermostat chamber.

3. A valve of the class described comprising a casing having an inlet, a thermostat chamber, said valve having a first communication between said inlet and said thermostat chamber, a valve member arranged to close said communication, a valve stem connected to said valve member, said valve having a second and restricted communication between said inlet and said thermostat chamber, cleaning means comprising said valve stem within said restricted communication, a thermostatic element within said thermostat chamber for actuating said valve stem and valve member and said valve having an outlet from said chamber.

4. A valve of the class described comprising a casing having an inlet, a thermostat chamber, said valve having a first communication between said inlet and said thermostat chamber, a valve member arranged to close said communication, said valve member having a face of resilient material, a valve stem connected to said valve member, said valve having a second and restricted communication between said inlet and said thermostat chamber, cleaning means comprising said valve stem within said restricted communication, a thermostatic element within said thermostat chamber for actuating said valve stem and valve member and said valve having an outlet from said thermostat chamber.

5. A valve of the class described comprising a casing having an inlet, a thermostat chamber, said valve having a first communication between said inlet and said thermostat chamber, a valve member arranged to close said communication, said valve member having a face of resilient material, said valve having a second and restricted communication between said inlet and said thermostat chamber, cleaning means within said restricted communication, a thermostatic element within said thermostat chamber for actuating said valve member and said valve having an outlet from said chamber.

6. A valve of the class described comprising a casing having an inlet, a thermostat chamber, said valve having a first communication between said inlet and said thermostat chamber, a valve member arranged to close said communication, said valve member having a face of resilient material, said valve having a second and restricted communication between said inlet and said thermostat chamber, cleaning means within said restricted communication, a thermostatic element within said thermostat chamber for actuating said valve member and said cleaning means and said valve having an outlet from said chamber.

7. A valve of the class described comprising a casing having an inlet, a thermostat chamber, said valve having a first communication between said inlet and said thermostat chamber, means to close said first communication, said valve having a second and restricted communication between said inlet and said thermostat chamber, a cleaning member within said restricted communication, means to cause said cleaning member to rotate, a thermostatic element in said thermostat chamber for actuating the closing means and said valve having an outlet from said chamber.

8. A valve of the class described comprising a casing having an inlet, a thermostat chamber, said valve having a first communication between said inlet and said thermostat chamber, means to close said first communication, said valve having a second and restricted communication between said inlet and said thermostat chamber, a cleaning member within said restricted communication, a thermostatic element within said thermostat chamber for actuating said closing means and reciprocating said cleaning member, additional means to cause said cleaning member to rotate and said valve having an outlet from said chamber.

9. A valve of the class described comprising a casing having an inlet, a thermostat chamber, said valve having a first communication between said inlet and said thermostat chamber, a valve member for closing said first communication, a valve stem connected to said valve member, said valve having a restricted communication between said inlet and said thermostat chamber, cleaning means comprising said valve stem within said restricted communication, a thermostatic element within said thermostat chamber for reciprocating said valve stem and valve member, additional means to cause the rotation of said valve stem and said valve having an outlet from said chamber.

In testimony whereof we have affixed our signatures.

ALVAR LENNING.
ROBERT SETH TAYLOR.